United States Patent
Wong et al.

(10) Patent No.: US 6,477,859 B2
(45) Date of Patent: Nov. 12, 2002

(54) INTEGRATED HEAT EXCHANGER SYSTEM FOR PRODUCING CARBON DIOXIDE

(75) Inventors: Kenneth Kai Wong, New Milford, CT (US); Dante Patrick Bonaquist, Grand Island, NY (US); Henry Edward Howard, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/000,447

(22) Filed: Dec. 4, 2001

(65) Prior Publication Data

US 2002/0059807 A1 May 23, 2002

Related U.S. Application Data (63) Continuation-in-part of application No. 09/756,167, filed on Jan. 9, 2001, now abandoned, which is a continuation-in-part of application No. 09/429,611, filed on Oct. 29, 1999, now abandoned.

(51) Int. Cl.$^7$ .................................................. F25J 3/00
(52) U.S. Cl. ........................................... 62/617; 62/928
(58) Field of Search .................................. 62/617, 928

(56) References Cited

U.S. PATENT DOCUMENTS

| | | | |
|---|---|---|---|
| 4,952,223 A | 8/1990 | Krishnamurthy et al. | 62/18 |
| 5,275,004 A | 1/1994 | Agrawal et al. | 62/24 |
| 5,592,832 A | 1/1997 | Herron et al. | 62/646 |
| 5,596,883 A | 1/1997 | Bernhard et al. | 62/618 |
| 5,694,790 A | 12/1997 | Lavin | 62/640 |
| 5,927,103 A | 7/1999 | Howard | 62/620 |

*Primary Examiner*—William C. Doerrler
(74) *Attorney, Agent, or Firm*—Donald T. Black (57) ABSTRACT

A system for producing carbon dioxide wherein carbon dioxide feed fluid is first processed in a cooling section of an integrated heat exchanger before purification in a column, and wherein column bottom fluid operates within one of an evaporating section and desuperheating section of the heat exchanger and refrigerant fluid operates within the other of the evaporating section and desuperheating section of the heat exchanger.

28 Claims, 4 Drawing Sheets

INTEGRATED HEAT EXCHANGER SYSTEM FOR PRODUCING CARBON DIOXIDE

This application is a continuation-in-part of U.S. application Ser. No. 09/756,167, filed Jan. 9, 2001, now abandoned which is a continuation-in-part of U.S. application Ser. No. 09/429,611, filed Oct. 29, 1999, now abandoned.

FIELD OF THE INVENTION

This invention generally relates to the recovery of carbon dioxide from a feed stream.

BACKGROUND ART

Large scale processing systems for recovering carbon dioxide from a feed stream are known in the art. Typically such systems while different in the details of operation are similar in complexity to systems which are used to carry out the cryogenic separation of air into its components and thus employ heat exchangers having relatively complicated structures as do processes required for the rigorous cryogenic separation of air. Such complicated structures are costly and it would be desirable to have a system for producing carbon dioxide which can employ a more advantageous heat exchanger arrangement.

Accordingly it is an object of this invention to provide a system for effectively producing carbon dioxide from a feed stream while employing an improved heat exchanger arrangment from that employed by conventional carbon dioxide recovery systems.

SUMMARY OF THE INVENTION

The above and other objects, which will become apparent to those skilled in the art upon a reading of this disclosure, are attained by the present invention, one aspect of which is a method for producing carbon dioxide comprising:

(A) passing carbon dioxide feed fluid through a cooling section of a heat exchanger having a cooling section, a desuperheating section and an evaporating section to produce cooled carbon dioxide feed fluid;

(B) passing cooled carbon dioxide feed fluid into a separation means, such as a column, and producing carbon dioxide product fluid in the separation means;

(C) recovering carbon dioxide product fluid from the lower portion of the separation means as product carbon dioxide; and (D) passing carbon dioxide product fluid through one of the evaporating section and the desuperheating section of the heat exchanger, and passing refrigerant fluid through one of the evaporating section and the desuperheating section of the heat exchanger.

Another aspect of the invention is apparatus for producing carbon dioxide comprising:

(A) a heat exchanger having a cooling section, a desuperheating section and an evaporating section, and means for passing carbon dioxide feed fluid to the cooling section of the heat exchanger;

(B) a separation means and means for passing carbon dioxide feed fluid from the cooling section of the heat exchanger to the separation means;

(C) means for recovering carbon dioxide product fluid from the lower portion of the separation means;

(D) means for passing carbon dioxide product fluid from the lower portion of the separation means through one of the desuperheating section and evaporating section of the heat exchanger, and means for passing refrigerant fluid through one of the evaporating section and the desuperheating section of the heat exchanger.

As used herein the term "indirect heat exchange" means the bringing of two fluid streams into heat exchange relation without any physical contact or intermixing of the fluids with each other.

As used herein the terms "upper portion" and "lower portion" mean those sections of a column respectively above and below the mid point of the column.

As used herein the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook, fifth edition, edited by R. H. Perry and C. H. Chilton, McGraw-Hill Book Company, New York, Section 13, *The Continuous Distillation Process*.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the more volatile component(s) in the vapor phase and thereby the less volatile component(s) in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases can be adiabatic or nonadiabatic and can include integral (stagewise) or differential (continuous) contact between the phases. Separation process arrangements that utilize the principles of rectification to separate mixtures are often interchangeably termed rectification columns, distillation columns, or fractionation columns.

As used herein the term "cooling section" means a section of a heat exchanger wherein a fluid stream releases heat indirectly to one or more other fluid streams thereby cooling and/or condensing that stream.

As used herein the term "desuperheating section" means a section of a heat exchanger wherein a fluid stream is cooled with an accompanying decrease in temperature and the heat exchange is carried out without a phase change, i.e. boiling or condensation.

As used herein the term "evaporating section" means a section of a heat exchanger wherein a fluid stream absorbs heat and is at least partially vaporized.

As used herein the term "refrigerant fluid" means a fluid which absorbs heat and is subsequently compressed and condensed against another fluid.

DETAILED DESCRIPTION OF PREFERRED EMBODIMENTS

A first preferred embodiment of the present invention will be discussed with reference to the single column carbon dioxide distillation system 130 shown in FIG. 1.

Feed stream 135, generally comprising at least 95 mole percent carbon dioxide as well as contaminants such as nitrogen, oxygen, water, argon, hydrogen, carbon monoxide and methane, enters a feed stream supply 136. Feed stream supply 136 compresses, cleans, dries and cools the feed stream using, for example, one or more compressors, phase separators and heat exchangers to prepare the feed stream for processing. Although not shown in FIG. 1, carbon adsorption beds may be used to extract hydrocarbons from the feed stream. A refrigeration system 160 circulates in streams 161 and 162 refrigerant fluid through feed stream supply 136 to assist in cooling the feed stream. Refrigeration system 160 may be a conventional refrigeration system. Examples of suitable refrigerant fluids include carbon dioxide, chlorodifluoromethane, ammonia and propane.

The cooled and dried feed stream exits feed stream supply 136 as stream 140 and enters a single integrated heat exchanger 145 with a temperature of about 40° F. to about 50° F. at a pressure of about 300 psia to about 350 psia. Heat exchanger 145 comprises a single module having two heat exchanger portions, each portion having a cooling section, a desuperheating section and an evaporating section. The feed stream is further cooled within heat exchanger 145 to a temperature of about −10° F. to about −20° F. in the cooling section of the first portion and is substantially liquefied in the cooling section of the second portion by transferring heat from the feed stream to stream 150 of carbon dioxide product fluid supplied from a separation means 165 and passing in the evaporating section of the first portion, and to stream 155 of refrigerant from refrigeration system 160 and passing in the desuperheating section of the first portion of heat exchanger 145.

The cooled carbon dioxide feed stream exits heat exchanger 145 as stream 170 and is introduced into the upper portion of separation means 165 to serve as the primary feed source to separation means 165. The carbon dioxide feed fluid flows down separation means 165 while being contacted with upwardly flowing stripping vapor such that the concentration of carbon dioxide in the feed fluid descending through separation means 165 becomes progressively enriched. Essentially pure liquid carbon dioxide is produced as carbon dioxide product fluid in the lower portion of separation means 165 and is withdrawn from the bottom of separation means 165. The stripping vapor is withdrawn from the upper portion of separation means 165.

Separation means 165 can be a column, which is preferred, such as a distillation column, or can be a phase separator vessel which may be equipped with heating means such as heating coils in the bottom area immersed in the liquid, to generate stripping vapor.

To provide stripping vapor, carbon dioxide product fluid is removed in stream 180 from the bottom of separation means 165 and is split into two streams. A first stream 150 is passed into heat exchanger 145 and is vaporized in an evaporating section of heat exchanger 145 at a temperature of about 0° F. to about 10°F. at a pressure of about 300 psia to about 350 psia as was previously described. The resulting carbon dioxide vapor is introduced into separation means 165 in the lower portion of separation means 165 and passes counter to the descending stream of liquid carbon dioxide. Thus, the carbon dioxide vapor resulting from warming the first stream 150 serves as the stripping vapor within separation means 165 to purify the descending feed stream.

A second stream 185 of the carbon dioxide product fluid removed from the bottom of separation means 165 is passed through flow control valve 190 and into heat exchanger 145. The second stream 185 is subcooled in a desuperheating section of heat exchanger 145 to a temperature of about −10° F. to about −20° F. in heat exchanger 145 by transferring heat to a refrigerant stream 195 supplied from refrigeration system 160 across a valve 200 and passing in an evaporating section of heat exchanger 145.

After exiting heat exchanger 145, a subcooled second stream 205 is split into two streams. A first stream 210 of the subcooled second stream 205 recovered as product carbon dioxide having a carbon dioxide concentration of up to 99.9 mole percent or more.

A second stream 215 of the subcooled second stream 205 is passed through valve 220 and is sent as 255 to a condenser 225 at a temperature of about −65° F. to about −55° F. at a pressure of about 80 psia to about 115 psia. Additionally, stripping vapor is fed as stream 230 to condenser 225 from the top of separation means 165 at a temperature of about −5° F. to about −15° F. The second stream 215 partially condenses the stripping vapor to a temperature of about −50° F. to about −60° F. The partially condensed stripping vapor is then passed as stream 235 from condenser 225 to a phase separator 240. Condensed impure liquid carbon dioxide from the bottom of phase separator 240 is returned as stream 245 to the top of separation means 165 for further processing. Waste gas from the top of phase separator 240 is vented as stream 250 to the atmosphere. The liquid carbon dioxide fed as stream 255 to vent condenser 225 to cool and condense the stripping vapor exits reflux condenser 225 as stream 260 and is passed through valve 265 and returned as stream 270 to feed stream supply 136.

Figure 1:
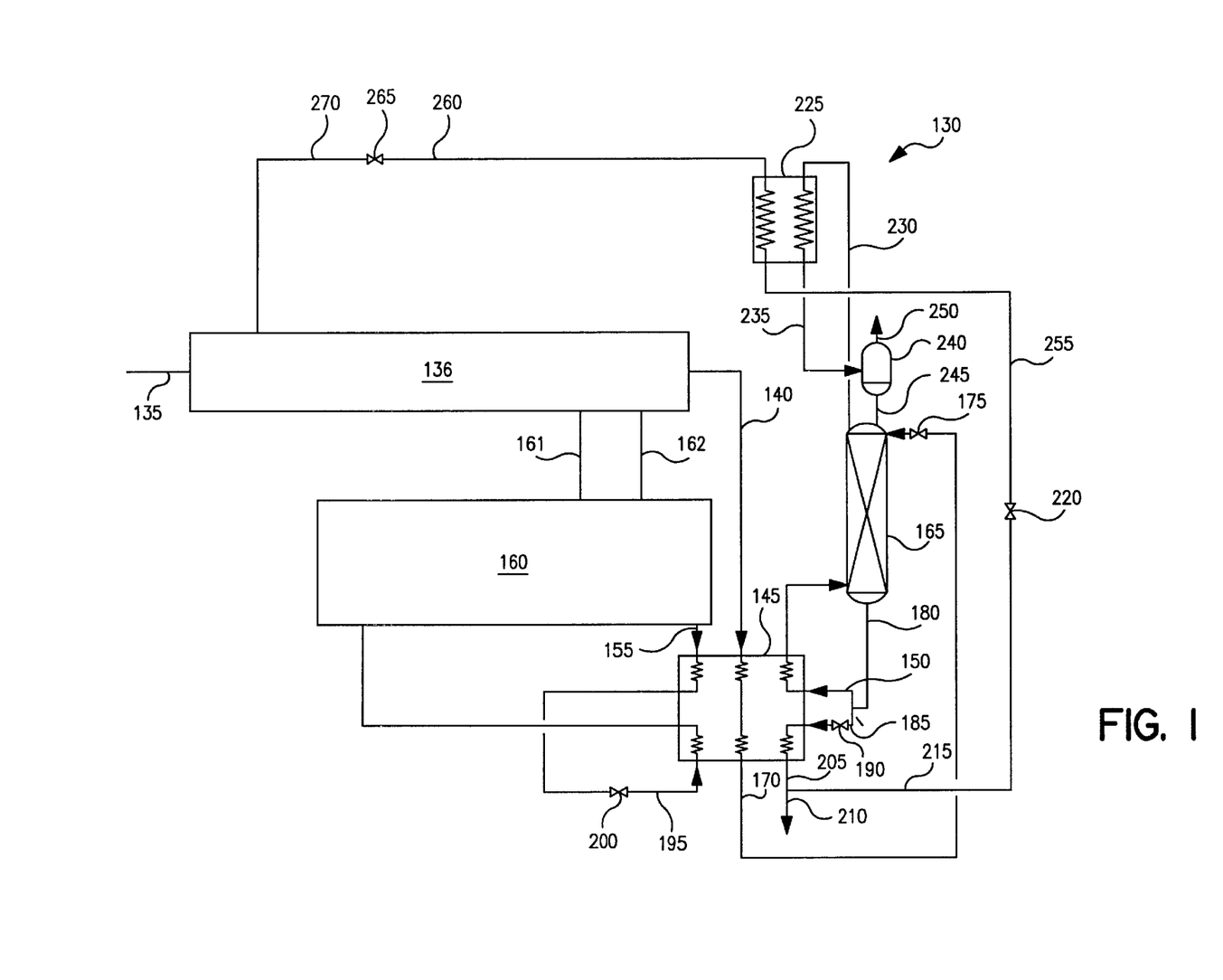
FIG. 1 is a schematic representation of a carbon dioxide recovery system as one preferred embodiment of the present invention.

Heat exchanger 145 in the first preferred embodiment illustrated in FIG. 1 is a single, integrated brazed aluminum plate-fin type heat exchanger. By way of explanation, a plate-fin type heat exchanger includes at least three heat conductive plates separated by predetermined distances. The separations between adjacent plates provide passages through which fluids flow. These passages may be filled with heat conductive structures, such as metal fins, to facilitate heat transfer from one passage to another. Thus, a warm fluid flowing in one passage may efficiently transfer heat to a colder fluid flowing in an adjacent channel.

A relatively large number of passages may be easily created in a plate-fin type heat exchanger to allow a relatively large number of fluids to participate in heat transfer operations. For example, heat exchanger 145 of the present invention includes sufficient passages to allow heat exchanger 145 to cool and liquefy the entering feed stream from about 45° F. to about −20° F., vaporize a refrigerant stream at about −25° F., subcool a portion of a product stream from about 0° F. to about −20° F., and partially vaporize a remaining portion of the column bottoms. Heat exchanger 145 thus provides the advantage of replacing multiple heat exchangers with a single integrated unit. Further, within heat exchanger 145 of the present invention unfavorable temperature differences are minimized. Less piping and related structures are required because the above-noted heat exchange operations are performed within a single integrated core.

Figure 2:
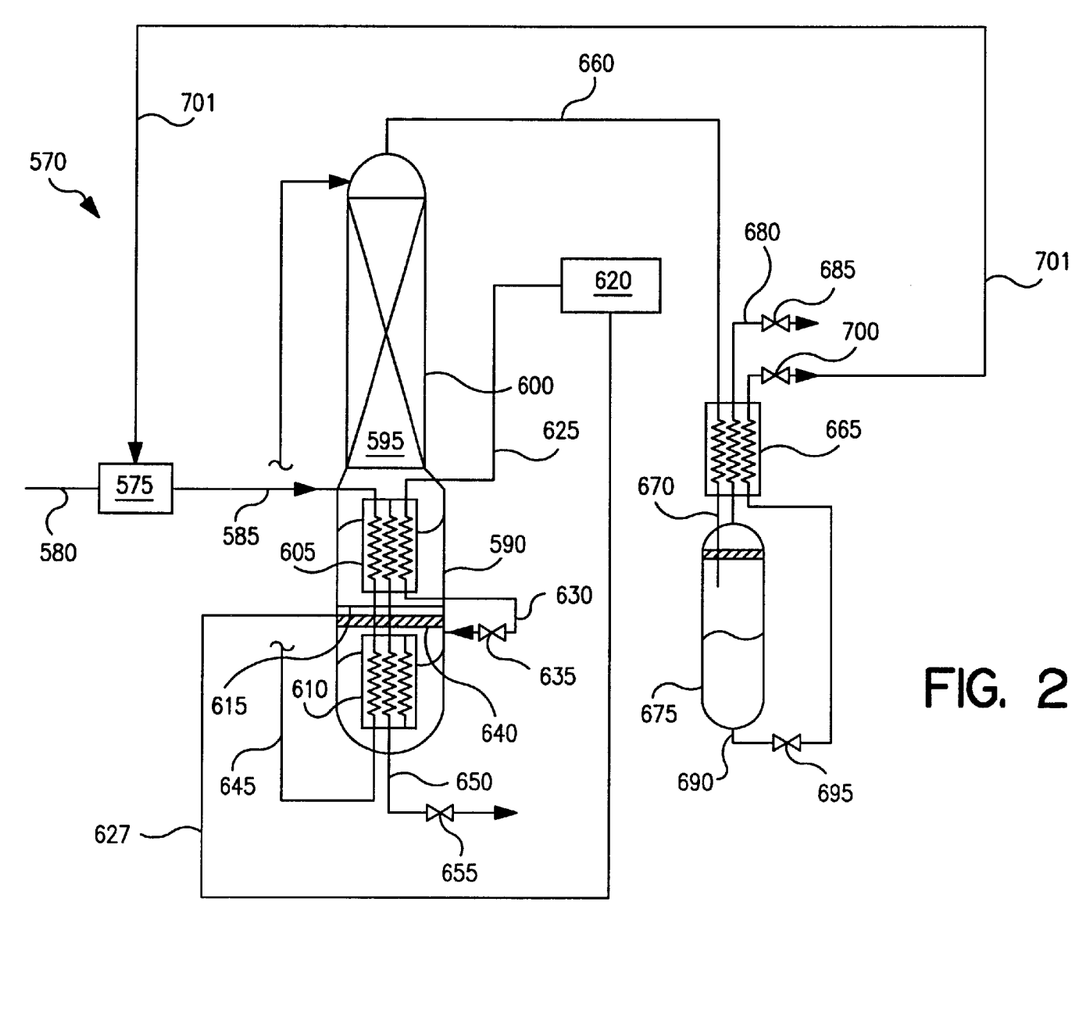
FIG. 2 is a schematic representation of a carbon dioxide recovery system as another preferred embodiment of the present invention.

Another preferred embodiment of the carbon dioxide recovery system of the present invention is illustrated in FIG. 2. This preferred embodiment provides, among other features, a carbon dioxide distillation system 570 having a single unit incorporating a heat exchanger into a distillation column.

The preferred embodiment illustrated in FIG. 2 uses a feed stream supply 575 for receiving a carbon dioxide feed stream 580 and compressing, cleaning, drying and cooling the feed stream.

The carbon dioxide feed stream exits feed stream supply 575 as stream 585 and enters a brazed aluminum plate-fin type main heat exchanger 590 located below a distillation unit 595 of a distillation column 600. At this stage, the feed stream has a temperature of about 40° F. to about 50° F. and a pressure of about 300 psia to about 350 psia. Main heat exchanger 590 includes a first heat exchanger portion 605 and a second heat exchanger portion 610 separated by a partition 615. The feed stream 585 entering first heat exchanger portion 605 is cooled by passage through the cooling section of heat exchanger portion 605 to a temperature of about 5° F. to about 15° F. by exchanging heat with column bottoms contained in the evaporating section of heat exchanger 605. Liquid refrigerant 625 from refrigeration supply 620 is subcooled in the desuperheating section of heat exchanger 605 and also against boiling carbon dioxide product fluid.

The carbon dioxide feed stream and the carbon dioxide product fluid surrounding first heat exchanger 605 pass through partition 615 and into second heat exchanger portion 610. Within second heat exchanger 610 the feed stream is substantially condensed by passing through the cooling section of second heat exchanger 610. The latent heat of feed condensation is imported to the refrigerant in the evaporating section of second heat exchanger 610. After condensation in second heat exchanger 610, the feed stream has a temperature of about −20° F.

To provide refrigerant to the evaporating section of second heat exchanger 610, the refrigerant leaves first heat exchanger 605, passes in stream 630 across a valve 635 and is re-introduced into distillation column shell 600 at a location below partition 615. The refrigerant then collects at the bottom of column 600 and surrounds second heat exchanger 610 at a temperature of about −25° F.

The refrigerant surrounding second heat exchanger 610 is vaporized by the condensing carbon dioxide feed stream. At this stage, the refrigerant vapor has a temperature of about −25° F. The refrigerant vapor passes through a demister 640 to remove liquid droplets and exits column 600 to be recycled as stream 627 through refrigeration supply system 620. The refrigerant also provides product subcooling of stream 650.

The cooled and liquefied feed stream exits second heat exchanger 610 as stream 645 and is fed to the upper portion of distillation unit 595. The liquid feed stream thus becomes the primary feed stream descending through distillation unit 595 for purification. The liquid cooled carbon dioxide feed stream is enriched in distillation unit 595 by contacting a counterflowing stripping vapor to become almost pure carbon dioxide product fluid. After flowing down distillation column 595, the liquid carbon dioxide product fluid collects above partition 615 and surrounds first heat exchanger 605 in the evaporating section of heat exchanger 605. The carbon dioxide product fluid surrounding first heat exchanger 605 contributes to cooling the carbon dioxide feed stream passing through the cooling section of first heat exchanger 605, and a portion of the carbon dioxide product fluid passes through partition 615 through a pipe and through second heat exchanger 610, as previously discussed. After passing through second heat exchanger 610, the carbon dioxide product fluid exits column 600 as stream 650 and passes through valve 655 for recovery as product carbon dioxide.

A portion of the carbon dioxide product fluid surrounding first heat exchanger 605 is vaporized by indirect heat exchange with the carbon dioxide feed stream passing through the cooling section of first heat exchanger 605. The resulting carbon dioxide vapor passes into distillation unit 595. Subcooled refrigerant stream 625 boils carbon dioxide product fluid surrounding first heat exchanger 605.

The stripping vapor collects at the top of distillation column 600 after passing countercurrently to the descending carbon dioxide feed fluid in distillation unit 595. The stripping vapor is then fed as stream 660 from the top of the distillation column 600 into a secondary heat exchanger 665 at a temperature of about −10° F. to about −20° F. Secondary heat exchanger 665 cools and partially condenses the stripping vapor to a temperature of about −40° F. to about −60° F. The partially condensed stripping vapor drains as stream 670 directly into a phase separator 675 by way of piping. Waste gas from the top of phase separator 675 passes as stream 680 through secondary heat exchanger 665, across a valve 685 and is vented directly to the atmosphere. Impure carbon dioxide liquid is withdrawn as stream 690 from the bottom of phase separator 675, passes through valve 695 and through secondary heat exchanger 665. The carbon dioxide liquid is subsequently passed through valve 700 and as stream 701 is passed into feed compression and prepurification unit 575.

The preferred embodiment illustrated in FIG. 2 provides many advantages. For example, incorporating most of the heat transfer and mass transfer functions of a carbon dioxide distillation system into a single unit reduces the necessary piping and equipment for producing essentially pure carbon dioxide from a feed stream. Thus, this embodiment of the present invention reduces the complexities and costs of producing carbon dioxide from a feed stream.

Figure 3:
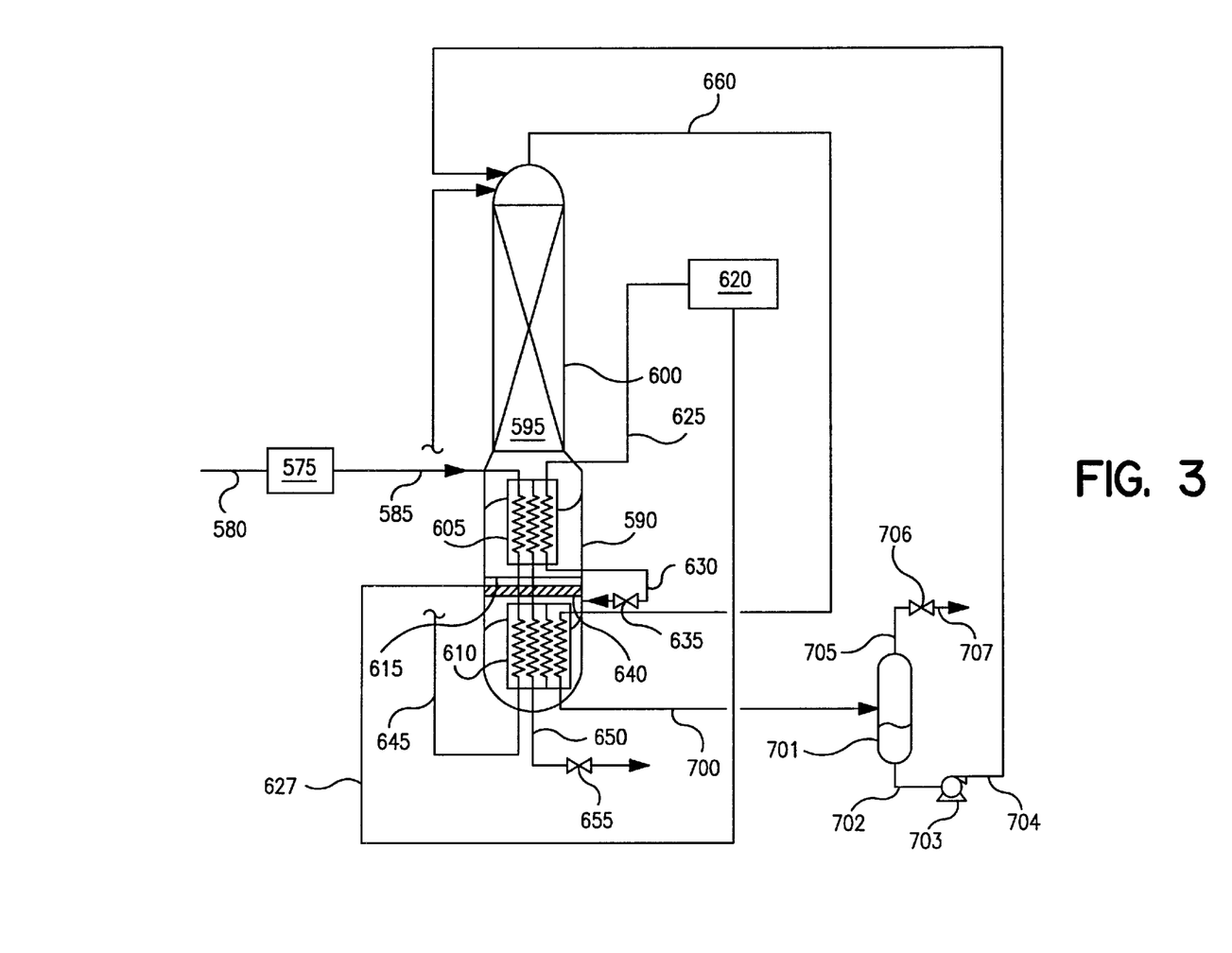
FIG. 3 is a schematic representation of a carbon dioxide recovery system incorporating another preferred embodiment of the present invention.
Figure 4:
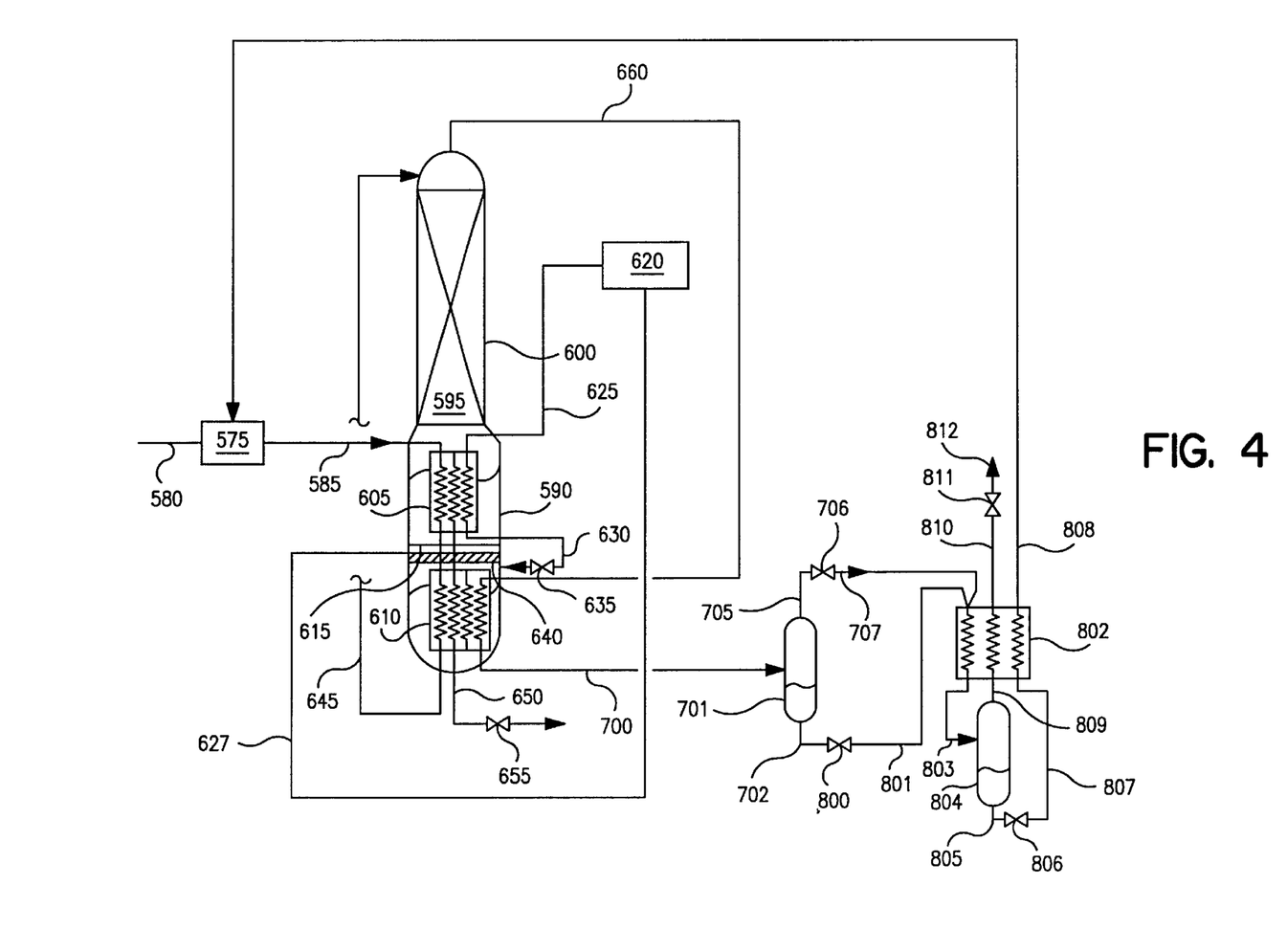
FIG. 4 is a schematic representation of a carbon dioxide recovery system incorporating yet another preferred embodiment of the present invention.

Additional preferred embodiments are shown in FIGS. 3 and 4 and are described below.

One such embodiment comprises recovering a vapor stream containing carbon dioxide from the top of the distillation column, passing said vapor stream through one or both cooling sections of the heat exchanger to cool and partially condense said stream, separating said partially condensed stream into a liquid condensate stream enriched in carbon dioxide and a carbon dioxide depleted vapor stream, and passing said carbon dioxide enriched liquid condensate stream into said distillation column.

With reference to FIG. 3, overhead gas stream 660 is directed to an additional pass through heat exchanger 610. The stream is cooled and partially condensed to −15 to −20° F. and exits as stream 700. Stream 700 is phase separated in vessel 701. Condensate stream 702 which is enriched in carbon dioxide is directed to a mechanical pump 703 where it is pressurized to a pressure greater than the presure in column 595. The pressurized condensate stream is then directed to the upper section of column 704. Alternatively, stream 704 can be directed into column feed pipe 645. The vapor derived from vessel 701 contains residual light gas contaminants and is directed to an atmospheric vent through pipe 705, valve 706 and pipe 707.

The advantage posed by the arrangement shown in FIG. 3 stems from the fact that a separate heat exchanger is not required to obtain an increased fraction of carbon dioxide from the feed stream. This arrangement reduces total package height and eliminates the separate vent exchanger, refrigerant, piping and controls.

Another embodiment comprises recovering a vapor stream containing carbon dioxide from the top of the distillation column, passing said vapor stream through one or both cooling sections of the heat exchanger to cool and partially condense said stream thereby forming a vapor component and a liquid component, passing the vapor component and the liquid component together or separately into a second heat exchanger to further cool said liquid component and further partially condense said vapor component, recovering from said second heat exchanger a combined stream comprising said further cooled liquid component and said further partially condensed vapor component, separating said combined stream into a liquid condensate stream enriched in carbon dioxide and a carbon dioxide depleted vapor stream, passing said carbon dioxide depleted vapor stream and said carbon dioxide enriched liquid condensate stream through said second heat exchanger to vaporize said carbon dioxide enriched liquid into a carbon dioxide enriched vapor and to warm said carbon dioxide depleted vapor stream by heat exchange therein from said partially condensed vapor stream, and recycling said carbon dioxide enriched vapor to step (A) for passing through said cooling section.

With reference to FIG. 4, a carbon dioxide refrigerated vent condenser is incorporated into the process. In this arrangement, condensate stream 702 is directed through valve 800 and through pipe 801 into vent condenser 802. Vapor stream 705 is directed through valve 706 and through stream 707 and is rejoined with stream 801. Alternatively, stream 700 could be introduced into exchanger 802 directly. However, phase separator 701 is included in order to provide separate liquid and vapor streams which can be distributed individually within exchanger 802. If this were not done it is possible that maldistribution of liquid and vapor could occur within exchanger 802 reducing its overall efficiency. The combined stream emerges further cooled and further partially condensed as stream 803. Stream 803 is then phase separated in vessel 804. Condensate stream 805 is pressure reduced in valve 806 and directed to exchanger 802 via pipe 807. Stream 807 is substantially vaporized and emerges as gas stream 808 which can be recycled to feed compression train 575 (as previously noted in regard to FIGS. 1 and 2) for compression and subsequent additional carbon dioxide recovery. A residual vent gas stream 809 is taken from vessel 804 and warmed in exchanger 802 and vented to atmosphere through pipe 810, valve 811 and pipe 812.

The advantage posed by the embodiment of FIG. 4 stems from the fact that it is more suitable for lean feed streams (lower carbon dioxide content, <97% $CO_2$). Stream 803 is cooled/condensed to −60° F. and consequently significant additional carbon dioxide can be recovered as product. In addition, the embodiment of FIG. 4 offers the option of eliminating the additional mechanical pump 703 shown in FIG. 3. This saves cost and increases process reliability.

While the present invention has been described with respect to what is considered to be the preferred embodiments, the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for producing carbon dioxide comprising:
   (A) passing carbon dioxide feed fluid through a cooling section of a heat exchanger having a cooling section, a desuperheating section and an evaporating section to produce cooled carbon dioxide feed fluid;
   (B) passing cooled carbon dioxide feed fluid into a separation means and producing carbon dioxide product fluid in the separation means;
   (C) recovering carbon dioxide product fluid from the lower portion of the separation means as product carbon dioxide; and
   (D) passing carbon dioxide product fluid through one of the evaporating section and the desuperheating section of the heat exchanger, and passing refrigerant fluid through one of the evaporating section and the desuperheating section of the heat exchanger.

2. The method of claim 1 wherein carbon dioxide product fluid is passed through the evaporating section of the heat exchanger and refrigerant fluid is passed through the desuperheating section of the heat exchanger.

3. The method of claim 1 wherein carbon dioxide product fluid is passed through the desuperheating section of the heat exchanger and refrigerant fluid is passed through the evaporating section of the heat exchanger.

4. The method of claim 1 wherein the heat exchanger comprises a first portion and a second portion with each portion having a cooling section, a desuperheating section and an evaporating section, and wherein the carbon dioxide feed fluid passes through the cooling sections of each of the first and second portions, carbon dioxide product fluid passes through the evaporating section of the first portion and the desuperheating section of the second portion, and refrigerant fluid passes through the desuperheating section of the first portion and the evaporating section of the second portion.

5. The method of claim 4 further comprising recovering a vapor stream containing carbon dioxide from the top of the separation means, passing said vapor stream through one or both cooling sections of the heat exchanger to cool and partially condense said stream, separating said partially condensed stream into a liquid condensate stream enriched in carbon dioxide and a carbon dioxide depleted vapor stream, and passing said carbon dioxide enriched liquid condensate stream into said separation means.

6. The method of claim 4 further comprising recovering a vapor stream containing carbon dioxide from the top of the separation means, passing said vapor stream through one or both cooling sections of the heat exchanger to cool and partially condense said stream thereby forming a vapor component and a liquid component, passing the vapor component and the liquid component together or separately into a second heat exchanger to further cool said liquid component and further partially condense said vapor component, recovering from said second heat exchanger a combined stream comprising said further cooled liquid component and said further partially condensed vapor component, separating said combined stream into a liquid condensate stream enriched in carbon dioxide and a carbon dioxide depleted vapor stream, passing said carbon dioxide depleted vapor stream and said carbon dioxide enriched liquid condensate stream through said second heat exchanger to vaporize said carbon dioxide enriched liquid into a carbon dioxide enriched vapor and to warm said carbon dioxide depleted vapor stream by heat exchange therein from said partially condensed vapor stream, and recycling said carbon dioxide enriched vapor to step (A) for passing through said cooling section.

7. A method according to claim 1 wherein said separation means is a distillation column.

8. The method of claim 7 wherein carbon dioxide product fluid is passed through the evaporating section of the heat exchanger and refrigerant fluid is passed through the desuperheating section of the heat exchanger.

9. The method of claim 7 wherein carbon dioxide product fluid is passed through the desuperheating section of the heat exchanger and refrigerant fluid is passed through the evaporating section of the heat exchanger.

10. The method of claim 7 wherein the heat exchanger comprises a first portion and a second portion with each portion having a cooling section, a desuperheating section and an evaporating section, and wherein the carbon dioxide feed fluid passes through the cooling sections of each of the first and second portions, carbon dioxide product fluid passes through the evaporating section of the first portion and the desuperheating section of the second portion, and refrigerant fluid passes through the desuperheating section of the first portion and the evaporating section of the second portion.

11. The method of claim 10 further comprising recovering a vapor stream containing carbon dioxide from the top of the distillation column, passing said vapor stream through one or both cooling sections of the heat exchanger to cool and partially condense said stream, separating said partially condensed stream into a liquid condensate stream enriched in carbon dioxide and a carbon dioxide depleted vapor stream, and passing said carbon dioxide enriched liquid condensate stream into said distillation column.

12. The method of claim 10 further comprising recovering a vapor stream containing carbon dioxide from the top of the distillation column, passing said vapor stream through one or both cooling sections of the heat exchanger to cool and partially condense said stream thereby forming a vapor component and a liquid component, passing the vapor component and the liquid component together or separately into a second heat exchanger to further cool said liquid component and further partially condense said vapor component, recovering from said second heat exchanger a combined stream comprising said further cooled liquid component and said further partially condensed vapor component, separating said combined stream into a liquid condensate stream enriched in carbon dioxide and a carbon dioxide depleted vapor stream, passing said carbon dioxide depleted vapor stream and said carbon dioxide enriched liquid condensate stream through said second heat exchanger to vaporize said carbon dioxide enriched liquid into a carbon dioxide enriched vapor and to warm said carbon dioxide depleted vapor stream by heat exchange therein from said partially condensed vapor stream, and recycling said carbon dioxide enriched vapor to step (A) for passing through said cooling section.

13. Apparatus for producing carbon dioxide comprising:
(A) a heat exchanger having a cooling section, a desuperheating section and an evaporating section, and means for passing carbon dioxide feed fluid to the cooling section of the heat exchanger;
(B) a separation means and means for passing carbon dioxide feed fluid from the cooling section of the heat exchanger to the separation means;
(C) means for recovering carbon dioxide product fluid from the lower portion of the separation means;
(D) means for passing carbon dioxide product fluid from the lower portion of the separation means through one of the desuperheating section and evaporating section of the heat exchanger, and means for passing refrigerant fluid through one of the evaporating section and the desuperheating section of the heat exchanger.

14. The apparatus of claim 13 comprising means for passing carbon dioxide product fluid through the evaporating section of the heat exchanger, and means for passing refrigerant fluid through the desuperheating section of the heat exchanger.

15. The apparatus of claim 13 comprising means for passing carbon dioxide product fluid through the desuperheating section of the heat exchanger, and means for passing refrigerant fluid through the evaporating section of the heat exchanger.

16. The apparatus of claim 13 wherein the heat exchanger comprises a first portion and a second portion with each portion having a cooling section, a desuperheating section and an evaporating section, comprising means for passing carbon dioxide feed fluid to the cooling sections of each of the first and second portions, means for passing carbon dioxide product fluid to the evaporating section of the first portion and the desuperheating section of the second portion, and means for passing refrigerant fluid to the desuperheating section of the first portion and to the evaporating section of the second portion.

17. The apparatus of claim 16 wherein the first and second portions are contained in a single heat exchanger module.

18. The apparatus of claim 16 wherein the first and second portions are contained in separate heat exchanger modules.

19. The apparatus of claim 16 further comprising means for recovering a vapor stream containing carbon dioxide from the top of the separation means, means for passing said vapor stream through one or both cooling sections of the heat exchanger to cool and partially condense said stream, means for separating said partially condensed stream into a liquid condensate stream enriched in carbon dioxide and a carbon dioxide depleted vapor stream, and means for passing said carbon dioxide enriched liquid condensate stream into said separation means.

20. The apparatus of claim 16 further comprising means for recovering a vapor stream containing carbon dioxide from the top of the separation means, means for passing said vapor stream through one or both cooling sections of the heat exchanger to cool and partially condense said stream thereby forming a vapor component and a liquid component, means for passing the vapor component and the liquid component together or separately into a second heat exchanger to further cool said liquid component and further partially condense said vapor component, means for recovering from said second heat exchanger a combined stream comprising said further cooled liquid component and said further partially condensed vapor component, means for separating said combined stream into a liquid condensate stream enriched in carbon dioxide and a carbon dioxide depleted vapor stream, means for passing said carbon dioxide depleted vapor stream and said carbon dioxide enriched liquid condensate stream through said second heat exchanger to vaporize said carbon dioxide enriched liquid into a carbon dioxide enriched vapor and to warm said carbon dioxide depleted vapor stream by heat exchange therein from said partially condensed vapor stream, and means for recycling said carbon dioxide enriched vapor to step (A) for passing through said cooling section.

21. The apparatus of claim 13 wherein said separation means is a distillation column.

22. The apparatus of claim 21 comprising means for passing carbon dioxide product fluid through the evaporating section of the heat exchanger, and means for passing refrigerant fluid through the desuperheating section of the heat exchanger.

23. The apparatus of claim 21 comprising means for passing carbon dioxide product fluid through the desuperheating section of the heat exchanger, and means for passing refrigerant fluid through the evaporating section of the heat exchanger.

24. The apparatus of claim 21 wherein the heat exchanger comprises a first portion and a second portion with each portion having a cooling section, a desuperheating section and an evaporating section, comprising means for passing carbon dioxide feed fluid to the cooling sections of each of the first and second portions, means for passing carbon dioxide product fluid to the evaporating section of the first portion and the desuperheating section of the second portion, and means for passing refrigerant fluid to the desuperheating section of the first portion and to the evaporating section of the second portion.

25. The apparatus of claim 24 wherein the first and second portions are contained in a single heat exchanger module.

26. The apparatus of claim 24 wherein the first and second portions are contained in separate heat exchanger modules.

27. The apparatus of claim 24 further comprising means for recovering a vapor stream containing carbon dioxide from the top of the distillation column, means for passing said vapor stream through one or both cooling sections of the heat exchanger to cool and partially condense said stream, means for separating said partially condensed stream into a liquid condensate stream enriched in carbon dioxide and a carbon dioxide depleted vapor stream, and means for passing said carbon dioxide enriched liquid condensate stream into said distillation column.

28. The apparatus of claim 24 further comprising means for recovering a vapor stream containing carbon dioxide from the top of the distillation column, means for passing said vapor stream through one or both cooling sections of the heat exchanger to cool and partially condense said stream thereby forming a vapor component and a liquid component, means for passing the vapor component and the liquid component together or separately into a second heat exchanger to further cool said liquid component and further partially condense said vapor component, means for recovering from said second heat exchanger a combined stream comprising said further cooled liquid component and said further partially condensed vapor component, means for separating said combined stream into a liquid condensate stream enriched in carbon dioxide and a carbon dioxide depleted vapor stream, means for passing said carbon dioxide depleted vapor stream and said carbon dioxide enriched liquid condensate stream through said second heat exchanger to vaporize said carbon dioxide enriched liquid into a carbon dioxide enriched vapor and to warm said carbon dioxide depleted vapor stream by heat exchange therein from said partially condensed vapor stream, and means for recycling said carbon dioxide enriched vapor to step (A) for passing through said cooling section.

* * * * *